C. Beucus,
Flour Scoop.
No. 97,025.  Patented Nov. 23, 1869.
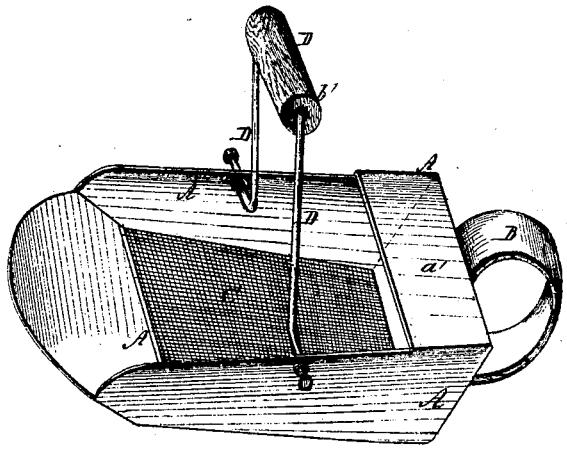
Witnesses:
Alex F. Roberts
Frank Blockley
Inventor:
C. Beucus
Per Munn & Co
Attorneys.

United States Patent Office.

CEPHUS BEUCUS, OF WAUPUN, WISCONSIN.

Letters Patent No. 97,025, dated November 23, 1869.

IMPROVED SCOOP AND SIFTER FOR FLOUR, &c.

The Schedule referred to in these Letters Patent and making part of the same

*To all whom it may concern:*

Be it known that I, CEPHUS BEUCUS, of Waupun, in the county of Fond du Lac, and State of Wisconsin, have invented a new and useful Improvement in Combined Scoop and Sifter; and I do hereby declare that the following is a full, clear, and exact description thereof, which will enable others skilled in the art to make and use the same, reference being had to the accompanying drawings, forming part of this specification.

The figure is a perspective view of my combined scoop and sifter.

The object of my invention is to furnish an improved combined scoop and sifter, for handling and sifting flour or other substances, and which shall be simple in its construction, easily and cheaply made, and efficient in operation.

The improvement consists in combining with the scoop and sifter, a bail whose ends are extended beyond the sides thereof, as hereinafter described.

The rear end and two sides of the body A of the scoop may be made vertical, or slightly inclined, or flaring. The forward end of the body A is made inclined for convenience in inserting it in the flour or other substance to be sifted.

The rear part of the body A is covered with a plate, a', which may be a continuation of the rear end, or a separate piece, as may be desired, and which is designed to give strength to the instrument.

B is a half circle or loop handle, attached to the rear end of the body A.

The lower edges of the sides and ends of the body A are bent inward, or have flanges formed upon them, to which are soldered or otherwise attached the edges of the wire screen C, which forms the body of the instrument, and through which the flour or other substance is sifted into the desired receptacle.

D is the bail, upon the middle part of which is placed a wooden roller, d', to serve as a handle. The ends of the bail D that pass through holes in the sides of the body A, or through ears attached to said sides, are made long, so that the instrument may be slid back and forth laterally upon them, to sift the flour or other substance.

When not used in sifting, the bail D may be dropped upon the plate a', and serve as a thumb-piece in using the instrument as a scoop.

The use of a bail for supporting or lifting a device of similar character to mine is illustrated in the patent of R. S. Mitchell, dated January 21, 1868, but such construction or combination forms no part of my invention.

Having thus described my invention,

I claim as new, and desire to secure by Letters Patent—

In combination with the body A of the scoop and sifter, the bail D, when its ends are extended to allow lateral movement of the instrument, substantially as herein shown and described, for the purpose specified.

CEPHUS BEUCUS.

Witnesses:
W. D. BLAKENEY,
CHARLS KIMBAL.